US012712829B2

(12) United States Patent
Tsirkin

(10) Patent No.: US 12,712,829 B2
(45) **Date of Patent: *Aug. 18, 2026**

(54) PAGE FAULT SUPPORT FOR VIRTUAL MACHINE NETWORK ACCELERATORS

(71) Applicant: Red Hat, Inc., Raleigh, NC (US)

(72) Inventor: Michael Tsirkin, Yokneam Illit (IL)

(73) Assignee: Red Hat, LLC, Raleigh, NC (US)

( * ) Notice: Subject to any disclaimer, the term of this patent is extended or adjusted under 35 U.S.C. 154(b) by 764 days.

This patent is subject to a terminal disclaimer.

(21) Appl. No.: 17/986,751

(22) Filed: Nov. 14, 2022

(65) Prior Publication Data

US 2023/0070239 A1 Mar. 9, 2023

Related U.S. Application Data

(63) Continuation of application No. 17/071,291, filed on Oct. 15, 2020, now Pat. No. 11,500,668.

(51) Int. Cl.
*H04L 49/90* (2022.01)
*G06F 9/455* (2018.01)
(Continued)

(52) U.S. Cl.
CPC .......... *H04L 49/90* (2013.01); *G06F 9/45558* (2013.01); *G06F 9/45545* (2013.01);
(Continued)

(58) Field of Classification Search
CPC ... H04L 49/90; H04L 49/9047; H04L 61/103; H04L 47/27; G06F 9/45558;
(Continued)

(56) References Cited

U.S. PATENT DOCUMENTS 6,532,525 B1 3/2003 Aleksic et al.
7,912,060 B1 * 3/2011 Chen ....................... H04L 47/27 370/231

(Continued)

OTHER PUBLICATIONS

Herrmann J., et al., "Virtualization Tuning and Optimization Guide," Red Hat Customer Content Services, 2020, 50 Pages, Retrieved from URL: https://access.redhat.com/documentation/en-US/red_hat_enterprise_linux/6/html-single// irtualization_tuning_and_optimization_guide/index.

(Continued)

*Primary Examiner* — Jungwon Chang
(74) *Attorney, Agent, or Firm* — Dority & Manning, P.A.

(57) ABSTRACT

Systems and methods for supporting page faults for virtual machine network accelerators. In one implementation, a processing device may receive, at a network accelerator device of a computer system, from a network, a first incoming packet and a second incoming packet. Responsive to receiving a first notification that an attempt to store the first incoming packet at a first buffer of a plurality of buffers associated with the network accelerator device caused a page fault, the processing device may store the first incoming packet at a second buffer and append a first identifier of the first buffer to a faulty buffer data structure. Responsive to receiving a second notification indicating a resolution of the page fault, the processing device may remove the first identifier from the faulty buffer data structure. The processing device may store the second incoming packet at the first buffer. The processing device may forward, to a driver of the network accelerator device, a second identifier of the second buffer and the first identifier of the first buffer.

18 Claims, 4 Drawing Sheets

(51) Int. Cl.
*H04L 49/9047* (2022.01)
*H04L 61/103* (2022.01)

(52) U.S. Cl.
CPC .............. *G06F 2009/45579* (2013.01); *G06F 2009/45583* (2013.01); *H04L 49/9047* (2013.01); *H04L 61/103* (2013.01)

(58) Field of Classification Search
CPC ......... G06F 9/4545; G06F 2009/45583; G06F 2009/45579; G06F 9/45545
USPC .................................. 370/231, 429; 711/206
See application file for complete search history.

(56) References Cited

U.S. PATENT DOCUMENTS 8,255,475 B2 8/2012 Kagan et al.
8,307,191 B1 11/2012 Jain
8,402,172 B2 3/2013 Muppirala et al.
8,745,276 B2 6/2014 Bloch et al.
8,875,162 B2 10/2014 Agesen et al.
9,003,171 B2 4/2015 Gonion
9,058,183 B2 6/2015 Woller et al.
9,201,793 B2 12/2015 Schneider
9,280,380 B2 3/2016 Tsirkin
9,535,855 B2 1/2017 Epstein
10,031,856 B2 7/2018 Duluk, Jr. et al.
11,074,206 B1 7/2021 Jalal et al.
2011/0161620 A1* 6/2011 Kaminski ........... G06F 12/1081 711/E12.001
2014/0089450 A1 3/2014 Raindel et al.
2014/0281357 A1* 9/2014 Duluk, Jr. ........... G06F 12/1072 711/206
2015/0212956 A1 7/2015 Tsirkin et al.
2015/0309839 A1 10/2015 Lu
2016/0077946 A1* 3/2016 Raikin ................ G06F 12/1009 710/14
2017/0052916 A1 2/2017 Kollu
2017/0228271 A1* 8/2017 Tsirkin ................ G06F 11/0712
2017/0329655 A1 11/2017 Yuan et al.
2017/0371769 A1* 12/2017 Merten ................. G06F 11/301
2019/0034208 A1 1/2019 Comparan et al.
2020/0004703 A1 1/2020 Sankaran et al.
2020/0050557 A1 2/2020 Wu et al.
2020/0125518 A1 4/2020 Ringe et al.
2020/0142699 A1 5/2020 Brown et al.
2020/0310993 A1* 10/2020 Kumar .................. G06F 3/0604
2021/0342272 A1* 11/2021 Tsirkin ................ G06F 9/45558
2022/0138071 A1 5/2022 Edara et al.
2022/0350694 A1* 11/2022 Tsirkin .................. G06F 11/073

OTHER PUBLICATIONS

OASIS: "Virtual I/O Device (VIRTIO) Version 1.1," Committee Specification Draft 01, Dec. 20, 2018, 132 Pages, Retrieved from URL: https://docs.oasis-open.org/virtio/virtio/v1.1/csprd01/virtio-v1.1-csprd01.html.

Sembrant A., "Hiding and Reducing Memory Latency- Energy-Efficient Pipeline and Memory System Techniques," Uppsala University, 2016, 86 Pages, Retrieved from URL: https://uu.diva-portal.org/smash/get/diva2:1040387/FULLTEXT01.pdf.

Stephane Eranian et al., "Virtual Memory in the IA-64 Linux Kernel", https://www.informit.com/articles/article.aspx?p=29961&seqNum=5, Informit, Nov. 8, 2002, 35 pgs.

Ilya Lesokhin, "I/O Page Faults", http://www.cs.technion.ac.il/users/wwwb/cgi-bin/tr-get.cgi/2015/MSC/MSC-2015-21.pdf, Technion—Israel Institute of Technology; Computer Science Department, Nov. 2015, 85 pgs.

Ilya Lesokhin et al., "Page Fault Support for Network Controllers", https://courses.engr.illinois.edu/ece598ms/sp2018/papers/paper254.pdf, Technion—Israel Institute of Technology; Mellanox Technologies; VMware Research, Apr. 8-12, 2017, 18 pgs.

Network Data Buffer Management, Microsoft, https://docs.microsoft.com/en-us/windows-hardware/drivers/netcx/network-data-buffer-management, Feb. 20, 2018, 4 pgs.

Jan Christoph Nordholz, ""Efficient Virtualization on Hardware with Limited Virtualization Support"", https://www.isti.tu-berlin.de/fileadmin/fg214/finished_theses/Nordholz/diplom_nordholz.pdf, Technical University BerlinInstitute for Software Technology and Theoretical Computer Science, May 2, 2011, 70 pgs.

Dan Siemon, "Queueing in the Linux Network Stack", Linux Journal, LLC, https://www.linuxjournal.com/content/queueing-linux-network-stack, Sep. 23, 2013, 11 pgs.

Tsirkin, Michael. "VirtIO without the Virt—Towards Implementations in Hardware by Michael Tsirkin", YouTube, uploaded by KVM Forum, Nov. 5, 2019, filmed Oct. 30, 2019; https://www.youtube.com/watch?v=bCOo-WAAZP4.

* cited by examiner

PAGE FAULT SUPPORT FOR VIRTUAL MACHINE NETWORK ACCELERATORS

RELATED APPLICATION

This application is a continuation of U.S. application Ser. No. 17/071,291, filed on Oct. 15, 2020, the contents of which are entirely incorporated by reference herein.

TECHNICAL FIELD

The present disclosure is generally related to virtualization systems, and more particularly, to page fault support for virtual machine network accelerators.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. To communicate over a network, a virtual machine may include a network device driver to receive and transmit data to and from the network using one or more network devices, including network accelerator devices.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
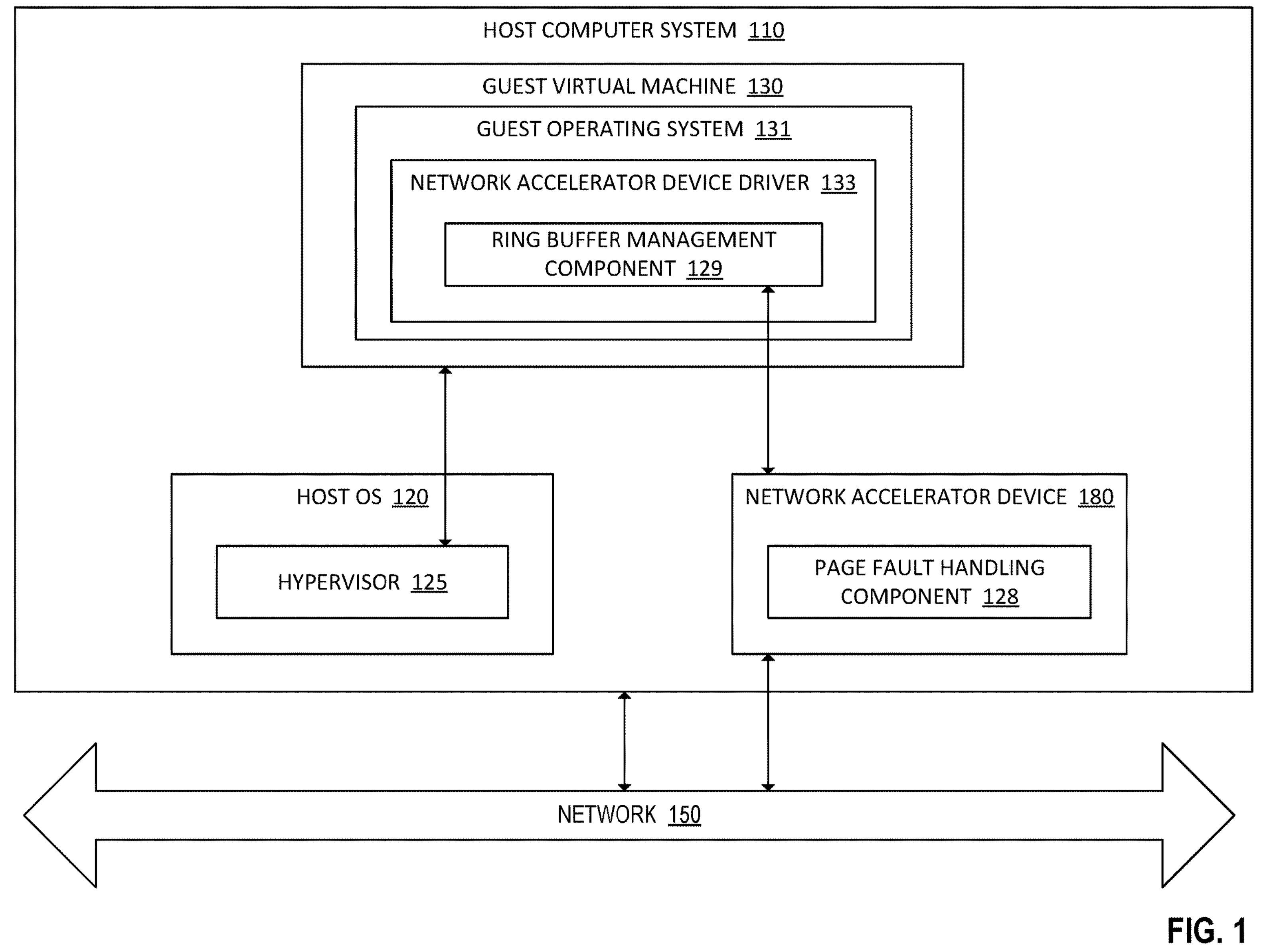
FIG. 1 depicts a high-level diagram of an example system architecture operating in accordance with one or more aspects of the present disclosure.

Implementations of the disclosure are directed to page fault support for virtual machine network accelerators.

Certain processor architectures support virtualization by providing special instructions for facilitating virtual machine execution. In certain implementations, a processor may support executing a hypervisor that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. Further, virtual machines can include network device drivers to communicate with network devices of the host system, such as network accelerator devices and/or network interface devices.

A network accelerator device is a hardware device that exposes an interface that matches the interface of a virtual device used by the hypervisor. Examples of a virtual machine network accelerator include virtual network interface controller (NIC) accelerators or virtual data path acceleration (vDPA). A virtio specification-compliant device is supported by a guest kernel space driver (virtio-net) and a host kernel space driver (vhost-net) with separate control plane and data plane defined between them. The vDPA is the host kernel space driver that supports the control plane communications between the virtio-net driver and a physical NIC, while the data plane communications are established directly between the virtio-net driver and the physical NIC. A network accelerator device may be assigned to a virtual machine, thus reducing the network latency without modifying any guest software or drivers.

Advanced memory management techniques at a host system, including memory swap for an over-committed processor of the host system, non-uniform memory access (NUMA), transparent hugepage support (THP), etc., may require the handling of page faults in order to detect and correct a situation where a memory page is not currently present. It is particularly important for a virtual machine to be able to handle page faults to efficiently support memory migration of the virtual machine. However, page fault handling is not fully supported for network accelerator devices.

In conventional systems, network accelerator devices may use a buffer receive ring to temporarily store packets waiting to be transmitted. Upon receiving an incoming packet from a network, the network accelerator device may attempt to store the packet at a buffer address in a receive ring. If the buffer access results in a page fault, the receiving ring is stalled. The network accelerator device may not be able to inform the sender of the packet to stop sending packets until the page fault is handled. Therefore, pausing the processing of incoming packets when the sender continues to send packets may result in buffer overrun and potential loss of some incoming packets. Hence, conventional systems do not support page fault handling for incoming packets of network accelerator devices, which may result in significant performance disruption as a result of a single page fault.

Aspects of the present disclosure address the above noted and other deficiencies by implementing technology to provide page fault support for a virtual machine network accelerator by enabling the network accelerator to utilize buffers in an order that may be different than the order in which the buffers were made available to the network accelerator. In accordance with aspects of the present disclosure, a network accelerator device of a computer system may receive incoming packets from a network, e.g., to be consumed by a process running in a virtual machine of the host system. A network accelerator device of the computer system may transmit and receive packets of data between the computer system and a network.

In one implementation, a driver of the network accelerator device may be running as part of a guest operation system of the virtual machine. A network accelerator device driver refers to a software component that enables the network accelerator device to communicate with the operating system, with the network, and with other network devices (e.g., other network accelerator devices, and/or network interface devices). The driver may allocate a receive ring that includes a set of memory buffers for storing incoming packets from the network, to be processed by the network accelerator device.

When the network accelerator device receives an incoming packet from the network, the device may select the next available buffer from the receive ring allocated by the driver for storing the incoming packet. Upon attempting to store the incoming packet at the selected buffer, the network accelerator device may receive a page fault notification indicating that the memory page containing the selected buffer is not currently present, for example, due to the memory page being moved to a different storage device, different region of memory, etc. In some implementations, the network accelerator device may store the address (and/or an identifier) of the faulting buffer in the local memory, e.g., in a faulty buffer list.

The network accelerator device may then attempt to store the incoming packet at the next buffer retrieved from the ring of buffers (e.g., at the buffer that immediately follows the first buffer in the ring of buffers). Upon successfully storing the network packet at the second buffer, the network accelerator device may append an identifier identifying the second buffer to a data structure (e.g., a queue). The data structure may store the order in which the buffers are to be consumed by the host system. The network accelerator device may store the data structure its local memory.

The host system may handle the page faults of the memory buffers whose addresses are stored within the faulty buffer list. Handling a page fault may include copying the memory page that triggered the page fault from a backing store to the main memory. The host system may use a page request interface (PRI) handler to take the appropriate action to recover the affected pages, for example. Upon successful resolution (or handling) of the page fault, the buffer address of the faulty buffer may be removed from the faulty buffer list. As an example, the network accelerator device driver may run a background thread to monitor the status of the page fault of the memory buffers assigned to the faulty buffer list, and to detect when a page fault of one of the memory buffers is handled. The background thread may then notify the network accelerator device when a page fault has been successfully handled, for example, by placing the buffer address in the receive ring. When the network accelerator device is notified that a page fault has been handled, the network accelerator device may remove the memory buffer associated with the completed page fault from the faulty buffer list. The network accelerator device may then use the memory buffer to store incoming packets, without interruption. In consuming the packets stored at the memory buffer, the network accelerator device driver is also configured to consume the packets from the memory buffers in an order that may be different from the order in which the driver allocated the buffers.

Aspects of the present disclosure present advantages over conventional solutions to the issues noted above. By supporting page faults for network accelerator devices, aspects of the present disclosure result in lower latency and higher throughput for networking. Specifically, the use of network accelerator devices with enabled page fault handling results in minimal service disruption while proceeding through the receive ring in order in cases where no faults were triggered. Aspects of the present disclosure reduce the risk of dropped incoming packets, thus reducing performance disruption within the network environment. By enabling the network accelerator device to use memory buffers in an order that may be different than the order in which the memory buffers were allocated (i.e., because memory buffers that generate a page fault can be skipped), the network accelerator device is able to store and consume incoming packets in an efficient way. The overhead of handling the page fault is minimized because the network accelerator device can proceed to use another memory buffer to store the incoming packet without having to wait for the page fault of the first memory buffer to be handled. Additionally, the incoming packets that are received at the network accelerator device are consumed in the same order in which they were received at the network accelerator device. As such, network accelerator devices may be assigned to guest virtual machines without concern over dropped incoming packets resulting from page faults.

FIG. 1 depicts an illustrative architecture of elements of a host computer system 110, in accordance with an embodiment of the present disclosure. It should be noted that other architectures for host computer system 110 are possible, and that the implementation of a computer system utilizing embodiments of the disclosure are not necessarily limited to the specific architecture depicted by FIG. 1. Host computer system 110 may comprise one or more processors communicatively coupled to memory devices and input/output (I/O) devices. Host computer system 110 runs a host operating system (OS) 120, which can comprise software that manages the hardware resources of the computer system and that provides functions such as inter-process communication, scheduling, virtual memory management, and so forth. In some examples, host operating system 120 also comprises a hypervisor 125, which provides a virtual operating platform for guest virtual machine (VM) 130 and manages its execution, e.g., by abstracting the physical layer, including processors, memory, and I/O devices, and presenting this abstraction to the VM as virtual devices. Guest VM 130 may be a software implementation of a machine that executes programs as though it were an actual physical machine. Although, for simplicity a single VM is depicted in FIG. 1, in some other embodiments host computer system 110 may comprise a plurality of VMs.

Guest VM 130 may have a corresponding guest operating system 131 that manages virtual machine resources and provides functions such as inter-process communication, scheduling, memory management, and so forth. Guest operating system 131 may run network accelerator device driver 133. Network accelerator device driver 133 may be a software component that enables network accelerator device 180 to communicate with guest operating system 131, as well as with other network accelerator devices and/or other network interface devices. Network accelerator device driver 133 may include ring buffer management component 129 that may facilitate page fault handling for network accelerator devices within host computer system 110. Ring buffer management component 129 may allocate a set of memory buffers within a data structure for storing incoming packets from network 150. In some implementations, the data structure may be a receive ring.

As shown in FIG. 1, host computer system 110 is connected to a network 150. Host computer system 110 may be a server, a mainframe, a workstation, a personal computer (PC), a mobile phone, a palm-sized computing device, etc. Network 150 may be a private network (e.g., a local area network (LAN), a wide area network (WAN), intranet, etc.) or a public network (e.g., the Internet). Host computer system 110 may also include network accelerator device 180. Network accelerator device 180 may be a network interface device with an added accelerated data path enabled. Hence, network accelerator device 180 may be internet protocol (IP) interfaces, bridge interfaces, virtual local area network (VLAN) interfaces, network interface cards (NICs) bonds, or NICs. Network accelerator device 180 may communicate directly with network 150. Although, for simplicity, a single network accelerator device is depicted in FIG. 1, in some other embodiments host computer system 110 may comprise a plurality of network accelerator devices. As shown, network accelerator device 180 may include page fault handling component 128 that may facilitate handling of memory page faults in network accelerator devices.

In certain implementations, network accelerator device 180 may receive an incoming packet from network 150, e.g., to be consumed by a process running on Guest VM 130. Page fault handling component 128 of network accelerator device 180 may select a buffer from a set of buffers of a receive ring that is allocated by ring buffer management component 129 of network accelerator device driver 133. The selected buffer may be the next buffer in the receive ring allocated by ring buffer management component 129.

Page fault handling component 128 may attempt to store the incoming packet at the selected buffer. Storing the incoming packet at the selected buffer may involve translating the buffer address associated with the selected buffer (e.g., translating the virtual address of the buffer to a corresponding physical address), followed by storing the incoming packet to a memory page identified by the translated address in the memory of the host computer system. The translation operation may cause a page fault (e.g., if the memory page identified by the translated address is not present in the main memory). Accordingly, if the translation operation causes a page fault, page fault handling component 128 may store the address of the selected buffer (i.e., the faulty buffer) in the memory associated with the network accelerator device 180.

Page fault handling component 128 may then attempt to store the incoming packet at another memory buffer of the set of memory buffers allocated by ring buffer management component 129. For example, page fault handling component 128 may attempt to store the incoming packet at the next buffer in the receive ring. In order to do so, page fault handling component 128 may retrieve the buffer identifier that identifies the next buffer from the receive ring.

In implementations, network accelerator device 180 may receive a second incoming packet from network 150. Page fault handling component 128 may select the next buffer from the set of buffers, or may select the first buffer that previously caused a page fault. Page fault handling component 128 may retrieve the buffer identifier that identifies the next buffer, and may store the second incoming packet at the next buffer. Page fault handling component 128 may forward the buffer identifiers in the order in which they were used to the driver, as is further described with respect to FIGS. 2 and 3.

In some implementations, page fault handling component 128 may maintain a data structure (e.g., an ordered list, or a queue) of identifiers indicating the order in which the buffers are used. The buffer identifier may be the buffer address. Upon successfully storing the packet at a memory buffer, page fault handling component 128 may append, to the data structure, an identifier of the memory buffer. The data structure may be stored in the local memory of network accelerator device 180. The data structure represents the order in which the buffers were used, and hence represents the order in which the incoming packets were received.

Page fault handling component 128 may forward the identifiers of the buffers to guest virtual machine 130 in the correct order (i.e., in the order in which they were received). In some embodiments, page fault handling component 128 may use the data structure to forward the identifiers in the correct order. This enables network accelerator device 180 to use the buffers in an order that is different from the order in which the buffers were allocated, thus enabling the network accelerator device 180 to resolve page faults without pausing the receipt incoming packets.

Host computer system 110 may handle the page faults of the faulty buffers stored in the faulty buffer list. The host computer system 110 may handle a page fault by bringing the memory page that triggered the page fault from a backing store to the physical main memory. In one implementation, in order to detect when the page fault has been handled, ring buffer management component 129 may run a background thread to monitor the status of the page fault of the memory buffers in the faulty buffer list. The background thread may then notify page fault handling component 128 that a page fault is handled, for example by placing the buffer identifier in the ring buffer. Page fault handling component 128 may wait for the notification before attempting to store a packet at a buffer that has previously resulted in a page fault. Additionally or alternatively, ring buffer management component 129 may make the newly restored memory buffer (i.e., for which the page fault has been handled) the next available memory buffer allocated to network accelerator device 180. Page fault handling component 128 may then use the newly restored buffer to store the next incoming packet. Furthermore, page fault handling component 128 may remove the address (and/or identifier) of the newly restored buffer from the faulty buffer list.

Upon successfully storing incoming packets at buffers within the receive ring, network accelerator device 180 may forward the packets to the guest virtual machine 130 in the order in which they were received. The packets may then be consumed by a process running on guest virtual machine 130 based on the order in which the packets were received at network accelerator device 180.

Network accelerator device driver 133 may be configured to process the buffers in the order in which page fault handling component 129 forwarded the buffer identifiers. That is, ring buffer management component 129 may enable network accelerator device driver 133 to process the buffers not in the order in which it made the buffers available, but rather in the order of identifiers received from network accelerator device 180. Ring buffer management component 129 may forward the packets in the buffers to guest operation system 131 in the order in which it received them from network accelerator device 180. Once the packets are consumed by a process running in guest virtual machine 130, ring buffer management component 129 may make the buffers available for use.

Figure 2:
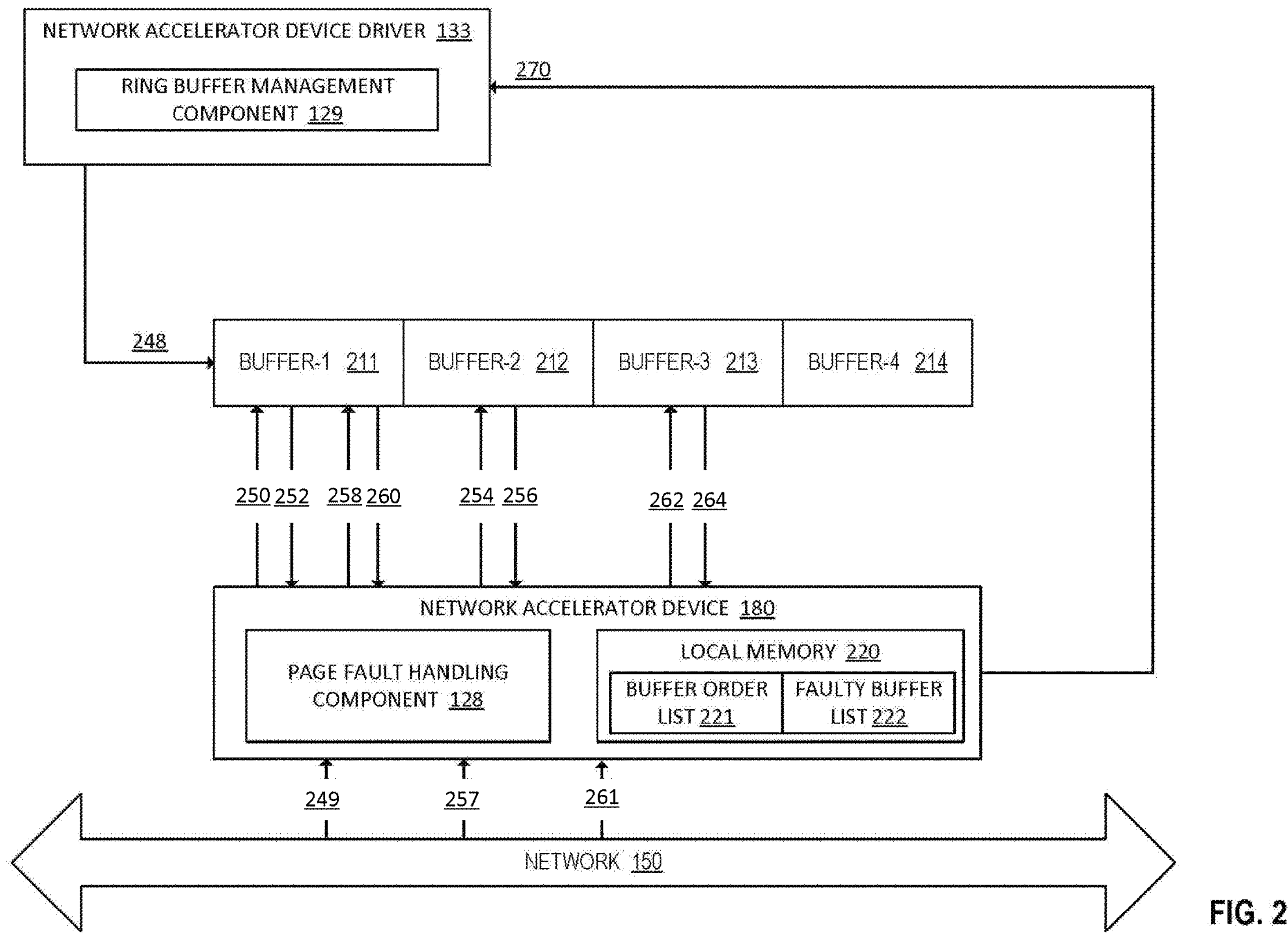
FIG. 2 depicts a block diagram of an example method illustrating handling page faults for virtual machine network accelerators when storing incoming packets, in accordance with one or more aspects of the present disclosure.

FIG. 2 depicts a block diagram of a method 200 illustrating handling page faults in memory buffers when storing incoming packets of network accelerator devices, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., host computer system 110 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

At operation 248, ring buffer management component 129 of network accelerator device driver 133 may allocate memory buffers buffer-1 211, buffer-2 212, buffer-3 213, and buffer-4 214. Network accelerator device 180 may store identifiers identifying buffers buffer-1 211, buffer-2 212, buffer-3 213, and buffer-4 214 in a data structure (e.g., a queue). Network accelerator device driver 133 may provide, to processing logic of a network accelerator device 180, the list of the buffer addresses (and/or buffer identifiers) at which to store incoming packets. While four buffers are depicted in FIG. 2, it should be noted that network accelerator device driver may allocate more or fewer than four buffers.

As described with regard to FIG. 1, the network accelerator device 180 may receive incoming packets from a network. At operation 249, processing logic of network accelerator device 180 may receive a first incoming packet from network 150. Processing logic may select buffer-1 211 to store the first incoming packet. At operation 250, process logic of network accelerator device 180, through page fault handling component 128, may attempt to store the first incoming packet at buffer-1 211. Storing the first incoming packet at buffer-1 211 may involve translating the virtual address of buffer-1 211 to a corresponding physical address, followed by storing the first incoming packet to a memory page identified by the translated address in the memory of the host computer system. At operation 252, processing logic may detect that buffer-1 211 is not present. For example, processing logic may detect the occurrence of a page fault, indicating that the translation operation (i.e., the translation of the virtual buffer address of buffer-1 211 to a corresponding physical address) failed because the memory page containing buffer-1 211, identified by the translated address, is not present in the main memory. Processing logic may store the address (and/or identifier) of buffer-1 211 in the faulty buffer list 222 in local memory 220.

At operation 254, processing logic may attempt to store the first incoming packet at buffer-2 212. At operation 256, processing logic may receive a notification indicating the successful storage of the first incoming packet at buffer-2 212. In some implementations, page fault handling component 128 may store a data structure (e.g., an ordered list or a queue, illustrated as buffer order list 221 in local memory 220) to indicate the order in which the packets were received, i.e., the order in which the buffers were used. In response to receiving a notification indicating the successful storage of the first incoming packet at buffer-2 212, processing logic may append buffer order list 221 to indicate that the first incoming packet is stored at buffer-2 212. The data structure may store an identifier identifying the buffer-2 212, and/or may store the memory address of buffer-2 212.

At operation 257, processing logic may receive a second incoming packet from network 150. At operation 258, processing logic may attempt to store the second incoming packet at buffer-1 211. In some implementations, processing logic may have received a notification that the page fault associated with the buffer-1 211 has been resolved before attempting to store the second incoming packet at buffer-1 211. At operation 260, processing logic may receive a notification indicating the successful storage of the second incoming packet at buffer-1 211. The processing logic may append the buffer order 221 to indicate that the second incoming packet is stored at buffer-1 211. Additionally, the processing logic may remove buffer-1 211 from faulty buffer list 222.

At operation 261, processing logic may receive a third incoming packet from network 150. At operation 262, processing logic may attempt to store the third incoming packet at the next buffer within the buffer ring, in this case at buffer-3 213. At operation 264, processing logic may receive a notification indicating the successful storage of the third incoming packet at buffer-3 213. Processing logic may append the buffer order list 221 with an identifier identifying buffer-3 213, to indicate that the third incoming packet is stored at buffer-3 213.

At operations 270, processing logic may forward the identifier of buffer-2 212, the identifier of buffer-1 211, and the identifier of buffer-3 213 to network accelerator device driver 133. In implementations, processing logic may use the buffer order list 221 stored within local memory 220 to identify the proper order of the buffer identifiers in forwarding the buffer identifiers to the driver. That is, processing logic may first identify the buffer used to store the first incoming packet as buffer-2 212, then the buffer used to the second incoming packet as buffer-1 211, and then the buffer used to store the third incoming packet as buffer-3 213. At operation 270, processing logic may then forward the buffer identifiers in the order in which they were received to network accelerator device driver 133, i.e., buffer-2 212, followed by buffer-1 211, followed by buffer-3 213. The network accelerator device driver 133 may then send the packets stored in the buffers in the correct order to the guest OS (i.e., guest OS 131 in FIG. 1).

Figure 3:
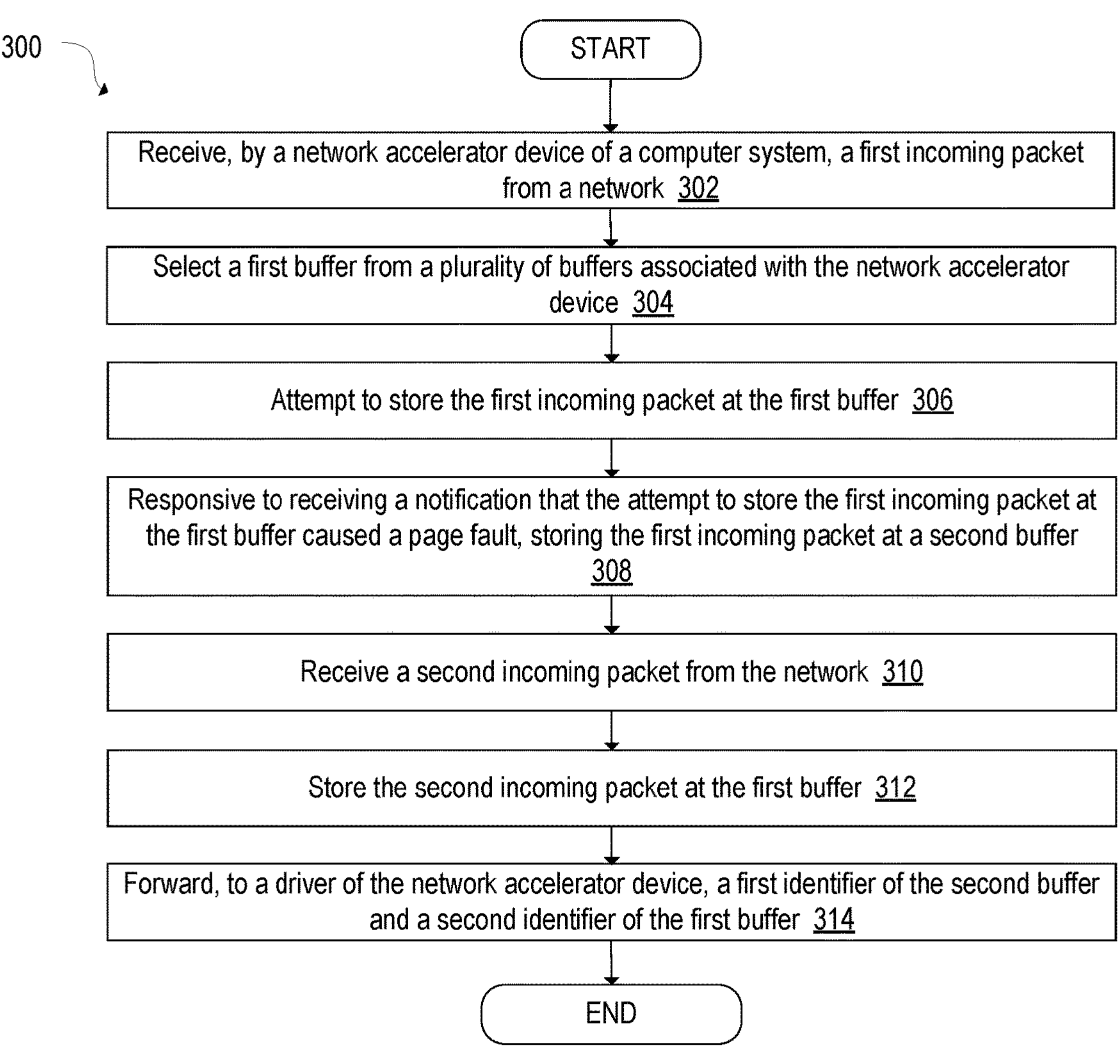
FIG. 3 is a flow diagram of an example method of supporting page faults for virtual machine network accelerators, in accordance with one or more aspects of the present disclosure.

FIG. 3 depicts a flow diagram of an example method 300 for facilitating page fault support for virtual machine network accelerators, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the host computer system 110 of FIG. 1) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

At block 302, processing logic may receive, by a network device of a computer system, a first incoming packet. The network device may be a network accelerator that may communicate with a virtual machine. The virtual machine may use a network accelerator device driver for consuming the incoming packet, as described in more detail herein above.

At block 304, processing logic may select a first buffer from a plurality of buffers associated with the network device. The plurality of buffers may be allocated by the network accelerator device driver, and may be made available to the processing logic in a receive ring of the network accelerator device driver. The first buffer may the next buffer in the receive ring.

At block 306, processing logic may attempt to store the first incoming packet at the first buffer. The attempt to store the first incoming packet at the first buffer may involve attempting to translate a virtual address associated with the first buffer to a physical address, for example, using an address translation table. The physical address may identify a memory page in the physical memory of the computer system. In response to successfully translating the virtual address to the physical address, the processing logic may store the first incoming packet at the memory page. At block 308, processing logic may receive a notification that the attempt to store the first incoming packet at the first buffer caused a page fault. The page fault may be generated because the memory page of the first buffer is currently not present at the expected memory address. In response to receiving such a notification, processing logic may store the first incoming packet at a second buffer. The second buffer may be the next buffer in the receive ring, or may be another buffer in the receive ring. Processing logic may retrieve, from a data structure that stores a plurality of buffer identifiers, a second buffer identifier. The second buffer identifier may identify the second buffer. The second buffer identifier may follow the first buffer identifier.

In some implementations, processing logic may store the address (or identifier) of the first buffer in a faulty buffer list. The computer system may then handle the page fault, for example using a page request interface (PRI) handler. The computer system may handle the page fault for each buffer in the faulty buffer list for example, by copying the memory page that triggered the page fault from a backing store to a main memory, or by allocating and initializing a new page frame. Once the page fault has been successfully handled, the network accelerator device driver may then make the newly restored buffer available as the next available buffer. In some implementations, processing logic may receive a notification that the page fault has been successfully handled.

At block 310, processing logic may receive a second incoming packet from the network. At block 312, processing logic may store the second incoming packet at the first buffer. In some implementations, processing logic may have received a notification that the page fault associated with the first buffer has been resolved prior to storing the second incoming packet at the first buffer. Processing logic may retrieve the first buffer identifier from the data structure that stores the buffer identifiers. The first buffer identifier may identify the first buffer, and may precede the second buffer identifier. Upon storing the second incoming packet at the first buffer, processing logic may update the data structure indicating the order in which the buffers were used. That is, processing logic may store the first buffer identifier (and/or the address of the first buffer) in the ordered list to indicate that the second incoming packet is stored at the first buffer.

At block 314, processing logic may forward a first identifier of the second buffer and a second identifier of the first buffer to a driver of the network accelerator device. In some implementations, the first identifier of the second buffer may be the second buffer identifier, and the second buffer of the first buffer may the first buffer identifier. Processing logic may use the data structure (e.g., ordered list or queue) associated with the network accelerator device to determine the order in which the buffers were used, i.e., to forward to buffer identifiers in the order in which they were received. The network accelerator device driver may be configured to consume the buffers in the order in which the processing logic transmitted the buffer identifiers, and not the order in which the buffers were made available. The network accelerator device driver may then forward the packets to the operation system in the order in which processing logic forwarded the buffer identifiers, thus ensuring that the packets are transmitted in the correct order.

Figure 4:
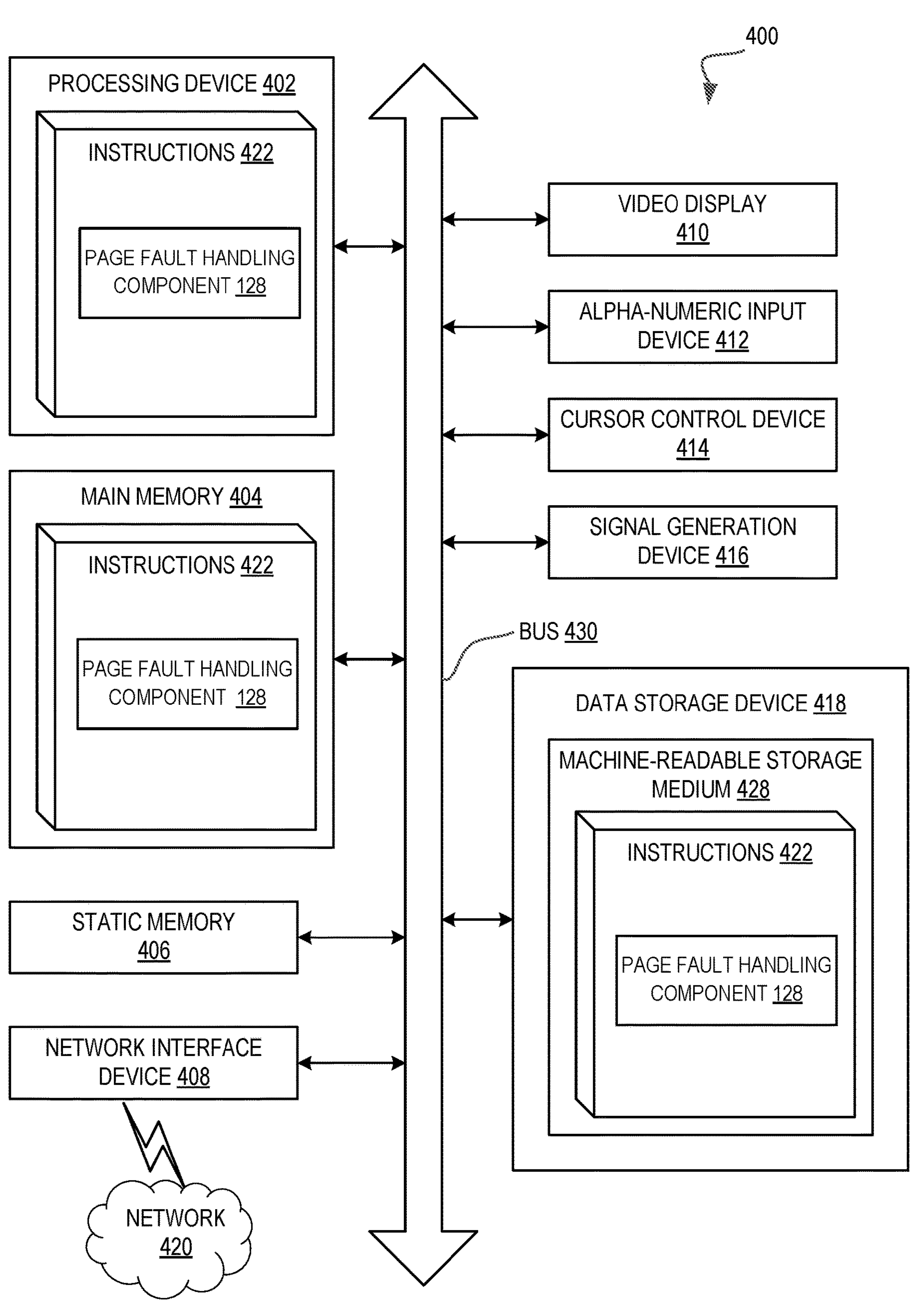
FIG. 4 depicts a block diagram of an illustrative computer system operating in accordance with one or more aspects of the present disclosure.

FIG. 4 depicts a block diagram of a computer system operating in accordance with one or more aspects of the disclosure. In various illustrative examples, computer system 400 may correspond to a computing device 110 within system architecture 100 of FIG. 1. In one implementation, the computer system 400 may be the computer system 110 of FIG. 1. The computer system 400 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 418, which may communicate with each other, as well as with other components of the system via a bus 430.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 408. Computer system 400 also may include a video display unit 410 (e.g., an LCD), an alphanumeric input device 412 (e.g., a keyboard), a cursor control device 414 (e.g., a mouse), and a signal generation device 416.

Data storage device 418 may include a non-transitory computer-readable storage medium 428 on which may store instructions 422 embodying any one or more of the methodologies or functions described herein (e.g., page fault handling component 128). Instructions 422 may also reside, completely or partially, within volatile memory 404 and/or within processing device 402 during execution thereof by computer system 400, hence, volatile memory 404 and processing device 402 may also constitute machine-readable storage media.

While computer-readable storage medium 428 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

receiving, by a network accelerator device of a computer system, from a network, a first incoming packet and a second incoming packet;

responsive to receiving a first notification that an attempt to store the first incoming packet at a first buffer of a plurality of buffers associated with the network accelerator device caused a page fault:

storing the first incoming packet at a second buffer of the plurality of buffers; and appending a first identifier of the first buffer to a faulty buffer data structure;

responsive to receiving a second notification indicating a resolution of the page fault, removing the first identifier from the faulty buffer data structure;

storing the second incoming packet at the first buffer; and forwarding, to a driver of the network accelerator device, a second identifier of the second buffer and the first identifier of the first buffer, wherein the plurality of buffers are allocated by the driver of the network accelerator device, and wherein the driver of the network accelerator device is executed by a guest operating system of a virtual machine running on the computer system.

2. The method of claim 1, further comprising:

attempting to translate a virtual address associated with the first buffer to physical address identifying a memory page in a physical memory of the computer system; and responsive to successfully translating the virtual address to the physical address, storing the first incoming packet at the memory page.

3. The method of claim 2, wherein the page fault is generated responsive to the memory page of the first buffer being not present in the physical memory of the computer system.

4. The method of claim 1, wherein storing the first incoming packet at the second buffer further comprises:

retrieving, from a data structure that stores a plurality of buffer identifiers, a second buffer identifier that follows a first buffer identifier identifying the first buffer, and wherein the second buffer identifier identifies the second buffer.

5. The method of claim 1, wherein storing the second incoming packet at the first buffer further comprises:

retrieving, from a data structure that stores a plurality of buffer identifiers, a first buffer identifier that precedes a second buffer identifier identifying the second buffer, and wherein the first buffer identifier identifies the first buffer.

6. The method of claim 1, further comprising:

appending the second identifier of the second buffer and the first identifier of the first buffer to a data structure that stores an order in which the buffers are to be consumed by the computer system.

7. A system comprising:

a memory; and a processing device operatively coupled to the memory, the processing device to:

receive, at a network accelerator device of a computer system, form a network, a first incoming packet and a second incoming packet;

responsive to receiving a first notification that an attempt to store the first incoming packet at a first buffer of a plurality of buffers associated with the network accelerator device caused a page fault:

store the first incoming packet at a second buffer of the plurality of buffers; and append a first identifier of the first buffer to a faulty buffer data structure;

responsive to receiving a second notification indicating a resolution of the page fault, remove the first identifier from the faulty buffer data structure;

store the second incoming packet at the first buffer; and forward, to a driver of the network accelerator device, a second identifier of the second buffer and the first identifier of the first buffer, wherein the plurality of buffers are allocated by the driver of the network accelerator device, and wherein the driver of the network accelerator device is executed by a guest operating system of a virtual machine running on the computer system.

8. The system of claim 7, wherein the processing device is further to:

attempt to translate a virtual address associated with the first buffer to physical address identifying a memory page in a physical memory of the computer system; and responsive to successfully translating the virtual address to the physical address, store the first incoming packet at the memory page.

9. The system of claim 8, wherein the page fault is generated responsive to the memory page of the first buffer being not present in the physical memory of the computer system.

10. The system of claim 7, wherein to store the first incoming packet at the second buffer, the processing device is further to:

retrieve, from a data structure that stores a plurality of buffer identifiers, a second buffer identifier that follows a first buffer identifier identifying the first buffer, and wherein the second buffer identifier identifies the second buffer.

11. The system of claim 7, wherein to store the second incoming packet at the first buffer, the processing device is further to:

retrieve, from a data structure that stores a plurality of buffer identifiers, a first buffer identifier that precedes a second buffer identifier identifying the second buffer, and wherein the first buffer identifier identifies the first buffer.

12. The system of claim 7, wherein the processing device is further to:

append the second identifier of the second buffer and the first identifier of the first buffer to a data structure that stores an order in which the buffers are to be consumed by the computer system.

13. A non-transitory computer-readable media storing instructions that, when executed, cause a processing device to:

receive, at a network accelerator device of a computer system, form a network, a first incoming packet and a second incoming packet;

responsive to receiving a first notification that an attempt to store the first incoming packet at a first buffer of a plurality of buffers associated with the network accelerator device caused a page fault:

store the first incoming packet at a second buffer of the plurality of buffers; and append a first identifier of the first buffer to a faulty buffer data structure;

responsive to receiving a second notification indicating a resolution of the page fault, remove the first identifier from the faulty buffer data structure;

store the second incoming packet at the first buffer; and forward, to a driver of the network accelerator device, a second identifier of the second buffer and the first identifier of the first buffer, wherein the plurality of buffers are allocated by the driver of the network accelerator device, and wherein the driver of the network accelerator device is executed by a guest operating system of a virtual machine running on the computer system.

14. The non-transitory computer-readable media of claim 13, wherein the processing device is further to:

attempt to translate a virtual address associated with the first buffer to physical address identifying a memory page in a physical memory of the computer system; and responsive to successfully translating the virtual address to the physical address, store the first incoming packet at the memory page.

15. The non-transitory computer-readable media of claim 14, wherein the page fault is generated responsive to the memory page of the first buffer being not present in the physical memory of the computer system.

16. The non-transitory computer-readable media of claim 13, wherein to store the first incoming packet at the second buffer, the processing device is further to:

retrieve, from a data structure that stores a plurality of buffer identifiers, a second buffer identifier that follows a first buffer identifier identifying the first buffer, and wherein the second buffer identifier identifies the second buffer.

17. The non-transitory computer-readable media of claim 13, wherein to store the second incoming packet at the first buffer, the processing device is further to:

retrieve, from a data structure that stores a plurality of buffer identifiers, a first buffer identifier that precedes a second buffer identifier identifying the second buffer, and wherein the first buffer identifier identifies the first buffer.

18. The non-transitory computer-readable media of claim 13, wherein the processing device is further to:

append the second identifier of the second buffer and the first identifier of the first buffer to a data structure that stores an order in which the buffers are to be consumed by the computer system.

* * * * *